United States Patent
Masuzawa et al.

(10) Patent No.: US 8,570,639 B2
(45) Date of Patent: Oct. 29, 2013

(54) ELECTROPHORETIC LIQUID, IMAGE DISPLAY MEDIUM, AND IMAGE DISPLAY DEVICE

(75) Inventors: Masahiro Masuzawa, Kanagawa (JP); Takashi Kitamura, Chiba (JP); Yoshitaku Yoshimatsu, Chiba (JP)

(73) Assignees: Ricoh Company, Ltd., Tokyo (JP); Chiba University, Chiba (JP)

( * ) Notice: Subject to any disclaimer, the term of this patent is extended or adjusted under 35 U.S.C. 154(b) by 68 days.

(21) Appl. No.: 13/139,603

(22) PCT Filed: Nov. 26, 2009

(86) PCT No.: PCT/JP2009/070279
§ 371 (c)(1),
(2), (4) Date: Jun. 14, 2011

(87) PCT Pub. No.: WO2010/082407
PCT Pub. Date: Jul. 22, 2010

(65) Prior Publication Data
US 2011/0255145 A1  Oct. 20, 2011

(30) Foreign Application Priority Data
Jan. 13, 2009 (JP) .................................. 2009-005084

(51) Int. Cl.
*G02B 26/00* (2006.01)
*G09G 3/34* (2006.01)
*G03G 17/04* (2006.01)

(52) U.S. Cl.
USPC ............................. 359/296; 345/107; 430/32

(58) Field of Classification Search
USPC ............... 359/296; 349/33; 345/49, 105, 107; 430/31–32
See application file for complete search history.

(56) References Cited

U.S. PATENT DOCUMENTS

| | | | |
|---|---|---|---|
| 6,241,921 B1 * | 6/2001 | Jacobson et al. | 264/1.36 |
| 2002/0171619 A1 * | 11/2002 | Gordon et al. | 345/107 |
| 2002/0180688 A1 * | 12/2002 | Drzaic et al. | 345/107 |
| 2004/0150613 A1 * | 8/2004 | Li et al. | 345/107 |
| 2005/0190431 A1 * | 9/2005 | Matsuda | 359/296 |
| 2008/0303778 A1 | 12/2008 | Machida et al. | |
| 2009/0268274 A1 | 10/2009 | Masuzawa et al. | |

FOREIGN PATENT DOCUMENTS

| | | |
|---|---|---|
| JP | 2002-511607 | 4/2002 |
| JP | 2005-524103 | 8/2005 |
| JP | 2005-533281 | 11/2005 |
| JP | 2006-518051 | 8/2006 |
| JP | 2008-33000 | 2/2008 |
| JP | 2008-304530 | 12/2008 |
| JP | 2009-9092 | 1/2009 |

(Continued)

OTHER PUBLICATIONS

Mar. 7, 2012 European search report in connection with counterpart European patent application No. 09 83 8372.

(Continued)

*Primary Examiner* — Dawayne A Pinkney
(74) *Attorney, Agent, or Firm* — Cooper & Dunham LLP (57) ABSTRACT

An electrophoretic liquid includes a first electrophoretic particle, a second electrophoretic particle having a polarity opposite to that of the first electrophoretic particle, a non-electrophoretic particle, and a transparent dispersion medium. In the electrophoretic liquid, the first, second, and non-electrophoretic particles are dispersed in the transparent dispersion medium.

4 Claims, 9 Drawing Sheets (56) References Cited

FOREIGN PATENT DOCUMENTS

| | | |
|---|---|---|
| JP | 2009-98382 | 5/2009 |
| TW | 550529 | 9/2003 |
| WO | WO99/53373 | 10/1999 |
| WO | WO02/079869 A1 | 10/2002 |
| WO | WO03/091797 | 11/2003 |
| WO | WO2004/010206 | 1/2004 |
| WO | WO2004/074911 A2 | 9/2004 |

OTHER PUBLICATIONS

International Search Report and Written Opinion in PCT/JP2009/070279.
Korean official action dated Aug. 16, 2012 (and English translation of the official action) in corresponding Korean patent application No. 10-2011-701597.
Taiwanese official action dated Mar. 19, 2013 in corresponding Taiwanese patent application No. 09 91 00291.

* cited by examiner

ELECTROPHORETIC LIQUID, IMAGE DISPLAY MEDIUM, AND IMAGE DISPLAY DEVICE

TECHNICAL FIELD

The present invention generally relates to an electrophoretic liquid, an image display medium, and an image display device.

BACKGROUND ART

With the recent development of information technology devices, an increasing amount of clerical work such as document preparations are being conducted via computers, and users of such devices are increasingly reading text via display terminals such as cathode-ray tube (CRT) displays and liquid crystal displays that display text, images, videos, and so on. These display devices, in general, quickly display digital data and rewrite displayed images, however, they are difficult to carry around. Moreover, since such display devices are light-emitting devices, reading displayed text or viewing displayed images for a long time strains the eyes. Further, those display devices cannot keep images displayed when they are turned off.

Meanwhile, if users desire to distribute or store the text and images as hard copies, the text and images are printed on paper. When users view the text and images that are printed on paper, they view multiply-scattered reflections of the text and images, and hence, the text and images printed on paper provide the users better visibility and less eyestrain compared with those displayed via light-emitting devices. Further, text and images printed on paper or those printed on paper media are lightweight and easy to handle, and therefore can be read in various postures. However, such paper media are likely to be thrown away after use. Although part of used paper media is recycled, recycling is laborious and costly.

As an image display medium that has advantages of both a display terminal and a paper medium, polymer-dispersed liquid crystals, bistable cholesteric liquid crystals, electrochromic elements, and electrophoretic display elements are well-known. These reflection-type image display media have drawn attention in terms of bright display with a memory capability. Especially, a display medium using electrophoretic display elements has an advantage in terms of display quality and power consumption during operation.

Japanese Patent Application Laid-Open (Translation of PCT Application) No. 2002-511607, for example, discloses microcapsules 22 each containing white particles W, red particles R and a suspending fluid 62 colored with cyan. These microcapsules 22 display cyan color when the particles W and R are respectively moved to bottom parts of the microcapsules when appropriate voltages are applied to electrodes 35 and 45. However, since light absorbed by the particles R gives no effect on formation of colors, the capsules 22 may not efficiently display cyan color.

SUMMARY OF THE INVENTION

Embodiments of the present invention may provide a novel and useful electrophoretic liquid capable of displaying colors of dyes, an image display medium having the electrophoretic liquid, and an image display device having the image display medium solving one or more of the problems discussed above.

An electrophoretic liquid according to an embodiment of the invention includes a first electrophoretic particle, a second electrophoretic particle having a polarity opposite to that of the first electrophoretic particle, a non-electrophoretic particle, and a transparent dispersion medium, in which the first, second, and non-electrophoretic particles are dispersed in the transparent dispersion medium.

An image display medium according to an embodiment of the invention includes a plurality of display elements each having the electrophoretic liquid according to the aforementioned embodiment, a first transparent electrode, a second electrode, and a third electrode.

An image display device includes the image display medium according to the aforementioned embodiment.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BEST MODE FOR CARRYING OUT THE INVENTION

Preferred embodiments of the present invention are described below with reference to the accompanying drawings.

An electrophoretic liquid according to an embodiment of the invention includes an electrophoretic white particle, an electrophoretic black particle having a polarity opposite to a polarity of the white electrophoretic particle, and a non-electrophoretic particle, which are dispersed in a transparent dispersion medium. With this configuration, an electrophoretic liquid capable of efficiently displaying color of a dye may be produced.

Note that the electrophoretic particles herein indicate particles that can exhibit sufficient electrophoretic behaviors in the dispersion medium within a predetermined response time when an electric field of 1 to 5 kV/cm is applied between the two electrodes arranged to face each other, that is, particles that have an electrostatic charge equal to or more than a predetermined electrostatic charge. Specifically, the absolute value of zeta potential of the electrophoretic particles is preferably in a range of 10 to 500 mV, and is more preferably in a range of 10 to 200 mV.

Note that the non-electrophoretic particles herein indicate particles that can exhibit little electrophoretic behaviours in the dispersion medium within a predetermined response time when an electric field of 1 to 5 kV/cm is applied between the two electrodes arranged to face each other, that is, particles that have an electrostatic charge lower than a predetermined electrostatic charge. Specifically, the absolute value of zeta potential of the non-electrophoretic particles is preferably below 10 mV, and is more preferably below 5 mV.

Examples of the electrophoretic white particles include, but are not limited to, inorganic particles such as white lead, zinc white, lithopone, titanium dioxide, zinc sulfide, antimony oxide, calcium carbonate, kaolin, mica, barium sulphate, gloss white, alumina white, talc, silica, calcium silicate, and these inorganic particles that are surface modified. These inorganic particles may be used individually or in combination of two or more.

A method for surface-modifying inorganic particles is not particularly specified. For example, surface modification of inorganic particles may be performed by coating the surface of a particle with a chemical compound such as a polymer, by mixing particles in polymers to perform mechanochemical treatment, by coupling using a coupling agent such as titanate or silane, or by graft polymerization.

In this embodiment, preferable materials for the electrophoretic white particles include inorganic particles such as surface-modified titanium dioxide. The surface of the titanium dioxide is modified with a silane coupling agent having a methoxy group, and the obtained product is then polymerized with a monomer having a lauryl group to thereby prepare the surface-modified titanium dioxide.

Preferable materials for the electrophoretic black particles include, but are not limited to, inorganic particles such as carbon black, iron black, manganese ferrite black, cobalt ferrite black, copper chrome black, copper chrome manganese black, titanium black, and these inorganic particles that are surface modified. These inorganic particles may be used individually or in combination of two or more.

A method for surface-modifying inorganic particles is not particularly specified. For example, surface modification of inorganic particles may be performed by coating the surface of a particle with a chemical compound such as a polymer, by mixing particles in polymers to perform mechanochemical treatment, by coupling using a coupling agent such as titanate or silane, or by graft polymerization.

In this embodiment, preferable materials for the electrophoretic black particles include surface modified materials of inorganic particles such as carbon black and surface-modified titanium black. The surface of the carbon black is modified with a diazo coupling agent having a vinyl group and the obtained product is then polymerized with a monomer having a 2-ethylhexyl group to thereby prepare the surface-modified carbon black. Note that the surface-modified carbon black is positively charged. The surface of the titanium black is modified with a silane coupling agent having a methoxy group, and the obtained product is then polymerized with monomers having a lauryl group to thereby prepare the surface-modified titanium black. Note that the surface-modified titanium black is negatively charged.

Preferable materials for the non-electrophoretic white particles include surface modified inorganic particles such as white lead, zinc white, lithopone, titanium dioxide, zinc sulfide, antimony oxide, calcium carbonate, kaolin, mica, barium sulphate, gross white, alumina white, talc, silica, calcium silicate, and polymer particles such as hollow polymer particles. These surface modified inorganic particles may be used individually or in combination of two or more.

A method for surface-modifying inorganic particles is not particularly specified. For example, surface modification of inorganic particles may be performed by coating the surface of a particle with a chemical compound such as a polymer, by mixing particles in polymers to perform mechanochemical treatment, by coupling using a coupling agent such as titanate or silane, or by graft polymerization.

Methods for producing hollow polymer particles include, but are not limited to, emulsion polymerization, seed emulsion polymerization, soap-free polymerization, dispersion polymerization, a combination of suspension polymerization and foaming, a combination of seed polymerization and foaming, a combination of seed polymerization and polymerization shrinkage, suspension polymerization of W/O/W emulsion, spray drying of liquid droplets, and seed coagulation where polymer emulsion is coagulated by adding solid electrolyte particles. Such methods are disclosed in "New Development of Particulate Polymer" (Toray Research Center, Inc.), "Microporous Polymer and Development in its Application" (Toray Research Center, Inc.), and "Latest Technology and Application of Polymer Microparticles" (CMC Publishing Co., Ltd.).

Materials for forming hollow polymer particles include, but are not limited to, styrene, styrene-acrylate, styrene-isoprene, divinyl benzene, methyl methacrylate, methacrylate, ethyl methacrylate, ethyl acrylate, n-butyl acrylate, acrylic acid, acrylonitrile, acrylate-methacrylate, ethylene, ethylene-acrylic acid, nylon, silicone, urethane, melamine, benzoguanamine, phenol, fluorine (tetrachloroethylene), vinylidene chloride, vinylnaphthalene, vinylcarbazole, quaternary pyridinium salt, synthetic rubber, cellulose, cellulose acetate, chitosan, calcium alginate, and materials prepared by cross-linking the above polymer materials.

In this embodiment, preferable materials for the non-electrophoretic white particles include polyvinylnaphthalene, polyvinylcarbazole, and surface-modified titanium dioxide. Polyvinylnaphthalene may be prepared by polymerization of vinylnaphthalene in a silicone oil using a silicone macromonomer as a dispersing agent. The surface-modified titanium dioxide may be prepared by coating titanium oxide with polyvinylnaphthalene.

Note that it is preferable that the aforementioned electrophoretic white particles, electrophoretic black particles, and non-electrophoretic white particles each have an average particle diameter of 0.01 to 100 μm, in view of dispersibilities and electrophoretic mobilities of electrophoretic particles and non-electrophoretic particles.

In this embodiment, a preferable transparent dispersion medium contains a nonpolar solvent and a dye.

Examples of the nonpolar solvents include, but are not limited to, aromatic hydrocarbons such as benzene, toluene, xylene, phenylxylylethane, diisopropylnaphthalene, and naphthenic hydrocarbon; aliphatic hydrocarbons such as hexane, dodecylbenzene, cyclohexane, kerosene, and paraffinic hydrocarbon; halogenated hydrocarbons such as chloroform, trichloroethylene, tetrachloroethylene, trifluoroethylene, tetrafluoroethylene, dichloromethane, and ethyl bromide; phosphoric esters such as tricresyl phosphate, trioctyl phosphate, octyldiphenyl phosphate, and tricyclohexyl phosphate; phthalate esters such as dibutyl phthalate, dioctyl phthalate, dilauryl phthalate, and dicyclohexyl phthalate; carboxylate esters such as butyl oleate, diethyleneglycol dibenzoate, dioctyl sebacate, dibutyl sebacate, dioctyl adipate, trioctyl trimellitate, acetyl triethyl citrate, octyl maleate, dibutyl maleate, and ethyl acetate; and others such as isopropylbiphenyl, isoamylbiphenyl, chlorinated paraffin, diisopropylnaphthalene, 1,1-ditolylethane, 1,2-ditolylethane, and N,N-dibutyl-2-butoxy-5-t-octyl aniline. The above nonpolar solvents may be used individually or in combination of two or more. Among the above non-polar solvents, paraffinic hydrocarbon is particularly preferable as the preferable transparent dispersion medium.

Examples of the dyes that are soluble include, but are not limited to, varifast yellow, oil yellow, varifast red, oil pink, oil scarlet, oil violet, varifast blue, oil blue, oil red, macrolex blue, sumiplast green, oil green, sudan red, quinoline yellow, sudan blue, and solvent blue. The above dyes may be used individually or in combination of two or more.

In addition, the transparent dispersion medium may also contain additives used, for example, to control the amount of surface charge or to improve the dispersibility of the electrophoretic and non-electrophoretic particles. Examples of additives include, but are not limited to, surfactants and protective colloids.

The surfactants are not particularly specified, and any surfactants that are soluble in the dispersion medium may be used. Examples of the surfactants include ionic surfactants including nonionic surfactants, anionic surfactants, cationic surfactants, and ampholytic surfactants. The above surfactants may be used individually or in combination of two or more.

Examples of the nonionic surfactants include:
Polyoxyalkylene alkylphenol ethers such as polyoxyethylene nonylphenol ether, polyoxyethylene dinonylphenol ether, polyoxyethylene octylphenol ether, polyoxyethylene styrenated phenol, polyoxyethylene bisphenol A, polyoxyethylene nonylphenyl ether, polyoxyethylene octylphenyl ether, and nonylphenol ethoxylate;
Polyoxyalkylene ethers such as polyoxyethylene castor oil, polyoxyalkylene block polymer, polyoxyethylene cetyl ether, polyoxyethylene lauryl ether, polyoxyethylene oleyl ether, polyoxyethylene stearyl ether, and polyoxypropylene ether;
Glycols such as monool type polyoxyalkylene glycol, diol type polyoxyalkylene glycol, triol type polyoxyalkylene glycol, monool block type polyalkylene glycol, diol block type polyalkylene glycol, and random type polyalkylene glycol;
Alkyl alcohol ethers such as primary linear alcohol ethoxylates including octylphenol ethoxylate, oleyl alcohol ethoxylate, and lauryl alcohol ethoxylate, secondary linear alcohol ethoxylates, and polyphenol ethoxylates;
Polyoxyalkylene alkyl esters such as polyoxyethylene rosin ester, polyoxyethylene lauryl ester, polyoxyethylene oleyl ester, and polyoxyethylene stearyl ester;
Sorbitan fatty acid esters such as sorbitan monolaurate, sorbitan monopalmitate, sorbitan monostearate, sorbitan dilaurate, sorbitan dipalmitate, sorbitan distearate, sorbitan sesquilaurate, sorbitan sesquipalmitate, and sorbitan sesquistearate;
Polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate, and polyoxyethylene sorbitan sesquistearate;
Fatty acid esters such as saturated fatty acid methyl ester, unsaturated fatty acid methyl ester, saturated fatty acid butyl ester, unsaturated fatty acid butyl ester, saturated fatty acid stearyl ester, unsaturated fatty acid stearyl ester, saturated fatty acid octyl ester, unsaturated fatty acid octyl ester, stearic acid polyethylene glycol ester, oleic acid polyethylene glycol ester, and rosin polyethylene glycol ester;
Fatty acids such as stearic acid, oleic acid, palmitic acid, lauric acid, and myristic acid, and their amides;
Polyoxyethylene alkyl amines such as polyoxyethylene lauryl amine, polyoxyethylene alkyl amine, and polyoxyethylene alkyl amine ether;
Higher fatty acid monoethanolamides such as lauric acid monoethanolamide and coconut fatty acid diethanolamide; higher fatty acid diethanolamides, and amide compounds such as polyoxyethylene stearic acid amide, coconut diethanolamide (1-2 type or 1-1 type), and alkyl alkylol amide;
Alkanol amines represented by the following formula:

$$H(OCH_2CH_2)_mNR(CH_2CH_2O)_nH$$

wherein R represents oleyl, octyl, dodecyl, tetradecyl, hexadecyl or octadecyl, and m and n each independently represent integers of one or more;
Primary amines represented by the following formula:

$$RNH_2$$

wherein R represents oleyl, octyl, dodecyl, tetradecyl, hexadecyl, or octadecyl;
Secondary amines represented by the following formula:

$$R_1R_2NH$$

wherein $R_1$ and $R_2$ each independently represent oleyl, octyl, dodecyl, tetradecyl, hexadecyl, or octadecyl;
Tertiary amines represented by the following formula:

$$R_1R_2R_3N$$

wherein $R_1$, $R_2$, and $R_3$ each independently represent oleyl, octyl, dodecyl, tetradecyl, hexadecyl, or octadecyl;
Synthesized higher alcohols and natural higher alcohols; and
Polymers and oligomers such as acrylic acid compounds, polycarboxylic acid compounds, hydroxyfatty acid oligomers, and derivatives of hydroxyfatty acid oligomers.

Examples of the anionic surfactants include:
Carboxylic acid salts such as polycarboxylic acid type polymer activator, polycarboxylic acid type nonionic activator, special fatty acid soap, and rosin soap;
Alcohol sulfuric ester salts such as castor oil sulfuric ester salt, sodium salt of lauryl alcohol sulfuric ester, amine salt of lauryl alcohol sulfuric ester, sodium salt of natural alcohol sulfuric ester, and sodium salt of higher alcohol sulfuric ester;
Sulfuric ester salts such as amine salt of lauryl alcohol ether sulfuric ester, sodium salt of lauryl alcohol ether sulfuric ester, amine salt of synthesized higher alcohol ether sulfuric ester, sodium salt of synthesized higher alcohol ether sulfuric ester, amine salt of alkylpolyether sulfuric ester, sodium salt of alkylpolyether sulfuric ester, amine salt of natural alcohol ethylene oxide adduct sulfuric ester, sodium salt of natural alcohol ethylene oxide adduct sulfuric ester, amine salt of synthetic alcohol ethylene oxide adduct sulfuric ester, sodium salt of synthetic alcohol ethylene oxide adduct sulfuric ester, amine salt of alkyl phenol ethylene oxide adduct sulfuric ester, sodium salt of alkyl phenol ethylene oxide adduct sulfuric ester, amine salt of polyoxyethylene nonylphenyl ether sulfuric ester, sodium salt of polyoxyethylene nonylphenyl ether sulfuric ester, amine salt of polyoxyethylene polyphenyl ether sulfuric ester, and sodium salt of polyoxyethylene polyphenyl ether sulfuric ester;

Sulfonic acid salts such as amine salts of alkylarylsulfonic acid, sodium salts of alkylarylsulfonic acid, amine salt of naphthalenesulfonic acid, sodium salt of naphthalenesulfonic acid, amine salts of alkylbenzenesulfonic acid, sodium salts of alkylbenzenesulfonic acid, naphthalenesulfonic acid condensate, and naphthalenesulfonic acid formalin condensate;

Polyoxyalkylene sulfonic acid salts such as amine salt of polyoxyethylene nonylphenyl ether sulfonic acid, sodium salt of polyoxyethylene nonylphenyl ether sulfonic acid, amine salt of polyoxyethylene special aryl ether sulfonic acid, sodium salt of polyoxyethylene special aryl ether sulfonic acid, amine salt of polyoxyethylene tridecylphenyl ether sulfonic acid, sodium salt of polyoxyethylene tridecylphenyl ether sulfonic acid, amine salt of polyoxyethylene alkyl ether sulfonic acid, and sodium salt of polyoxyethylene alkyl ether sulfonic acid;

Sulfosuccinic ester salts such as amine salt of dialkyl sulfosucinate, sodium salt of dialkyl sulfosucinate, amine salt of polyphenylpolyethoxy sulfosuccinate, sodium salt of polyphenylpolyethoxy sulfosuccinate, amine salt of polyoxyethylene alkyl ether sulfosuccinic monoester, and sodium salt of polyoxyethylene alkyl ether sulfosuccinic monoester; and Phosphoric esters and phosphates such as alkyl phosphoric ester, alkoxyalkyl phosphoric ester, higher alcohol phosphoric ester, higher alcohol phosphate, alkylphenol phosphoric ester, aromatic phosphoric ester, polyoxyalkylene alkyl ether phosphoric ester, and polyoxyalkylene alkylaryl ether phosphoric ester.

Examples of the cationic surfactants include:

Alkyltrimethyl amine quaternary ammonium salts represented by the following formula:

$RN(CH_3)_3^+X^-$ wherein R represents oleyl, octyl, dodecyl, tetradecyl, hexadecyl, or octadecyl, and X− represents a halide ion or acetate ion;

Quaternary ammonium salts such as tetramethylamine salt and tetrabutylamine salt;

Benzylamine quaternary ammonium salts such as lauryldimethylbenzyl ammonium salt (haloid salt, or the like), stearyldimethylbenzyl ammonium salt (haloid salt, or the like), and dodecyldimethylbenzyl ammonium salt (haloid salt, or the like); and Polyoxyalkylene quaternary ammonium salts represented by the following formula:

$H(OCH_2CH_2)mNR(CH_3)(CH_2CH_2O)_n^+X^-$ wherein R represents oleyl, octyl, dodecyl, tetradecyl, hexadecyl or octadecyl, X⁻ represents a halide ion, and m and n independently represent integers of 1 or more.

Examples of the amphoteric surfactants include betaine surfactants, imidazoline surfactants, β-alanine surfactants, and polyoctylpolyaminoethyl glycine hydrochloride.

As a protective colloid, any known protective colloid that is soluble in the dispersion medium of the electrophoretic liquid may be used.

Figure 1:
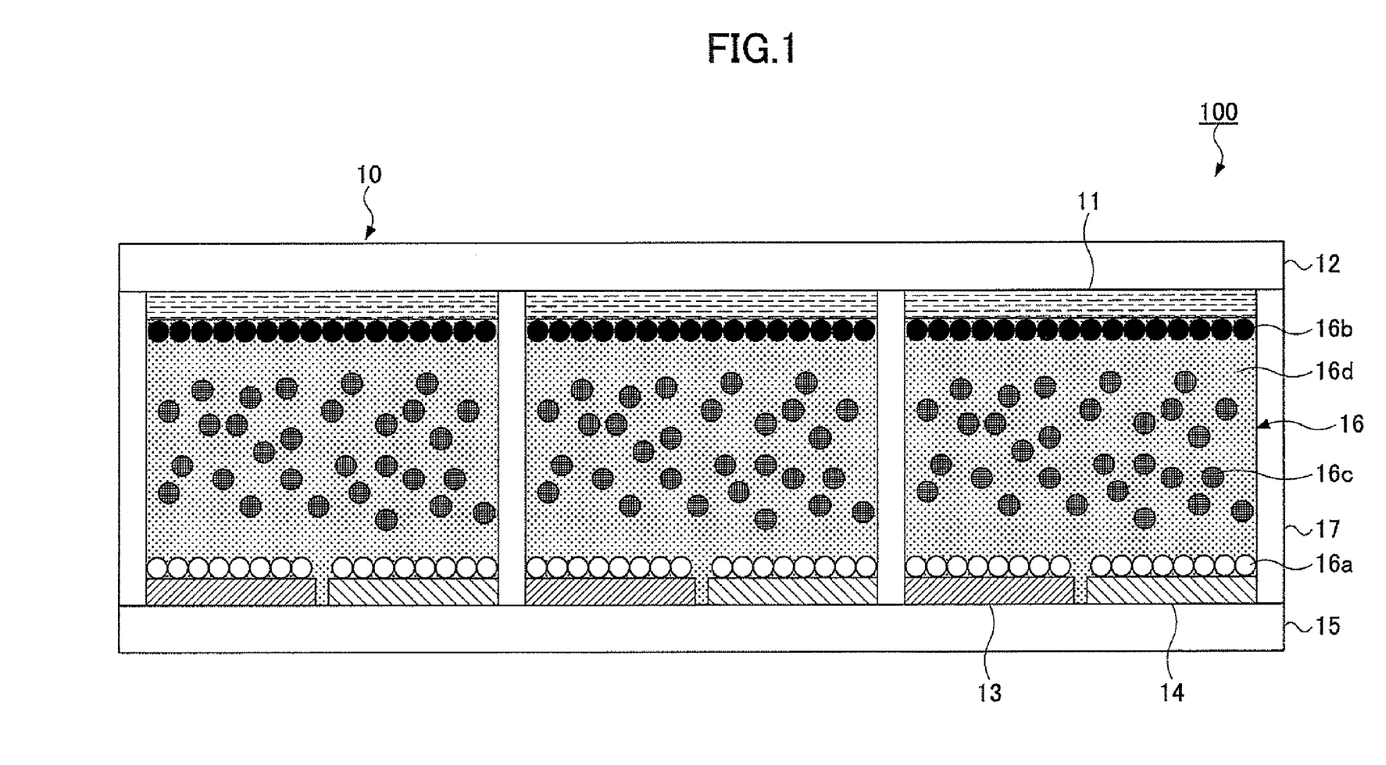
FIG. 1 is a cross-sectional diagram illustrating an example of an electrophoretic display medium according to an embodiment of the invention.

FIG. 1 illustrates an example of an image display medium according to an embodiment of the invention. An image display medium 100 includes plural display elements 10. Each of the display elements 10 includes a transparent substrate 12 having a first transparent electrode 11, a substrate 15 having a second electrode 13 and a third electrode 14 having a predetermined distance inbetween, an electrophoretic liquid 16, and a division wall 17. In the display element 10, the transparent substrate 12 and the substrate 15 are arranged so as to face each other via the electrophoretic liquid 16 and the division wall 17. The electrophoretic liquid 16 is composed of negatively charged electrophoretic white particles 16a, positively charged electrophoretic black particles 16b, non-electrophoretic white particles 16c, and a transparent dispersion medium 16d. In the electrophoretic liquid 16, the negatively charged electrophoretic white particles 16a, the positively charged electrophoretic black particles 16b, and the non-electrophoretic white particles 16c are dispersed in the transparent dispersion medium 16d.

In the display element 10, when voltages are applied such that the first electrode 11 is negatively charged, and the second and third electrodes 13 and 14 are positively charged, the electrophoretic white particles 16a accumulate on the second and third electrodes 13 and 14 whereas the electrophoretic black particles 16b accumulate on the first electrode 11. As a result, the display element 10 displays black color (see FIG. 1).

In contrast, when voltages are applied such that the first electrode 11 is positively charged, and the second and third electrodes 13 and 14 are negatively charged, the electrophoretic white particles 16a accumulate on the first electrode 11 whereas the electrophoretic black particles 16b accumulate on the second and third electrodes 13 and 14. As a result, the display element 10 displays white color.

Further, when no voltage is applied to the first electrode, and voltages are applied to the second and third electrodes 13 and 14 such that the second electrode 13 is positively (or negatively) charged and the third electrode 14 is negatively (or positively) charged, respectively, the electrophoretic white particles 16a accumulate on the second electrode 13 (or the third electrode 14) whereas the electrophoretic black particles 16b accumulate on the third electrode 14 (or second electrode 13). As a result, the display element 10 displays color of the dispersion medium 16d (see FIG. 2).

Figure 3:
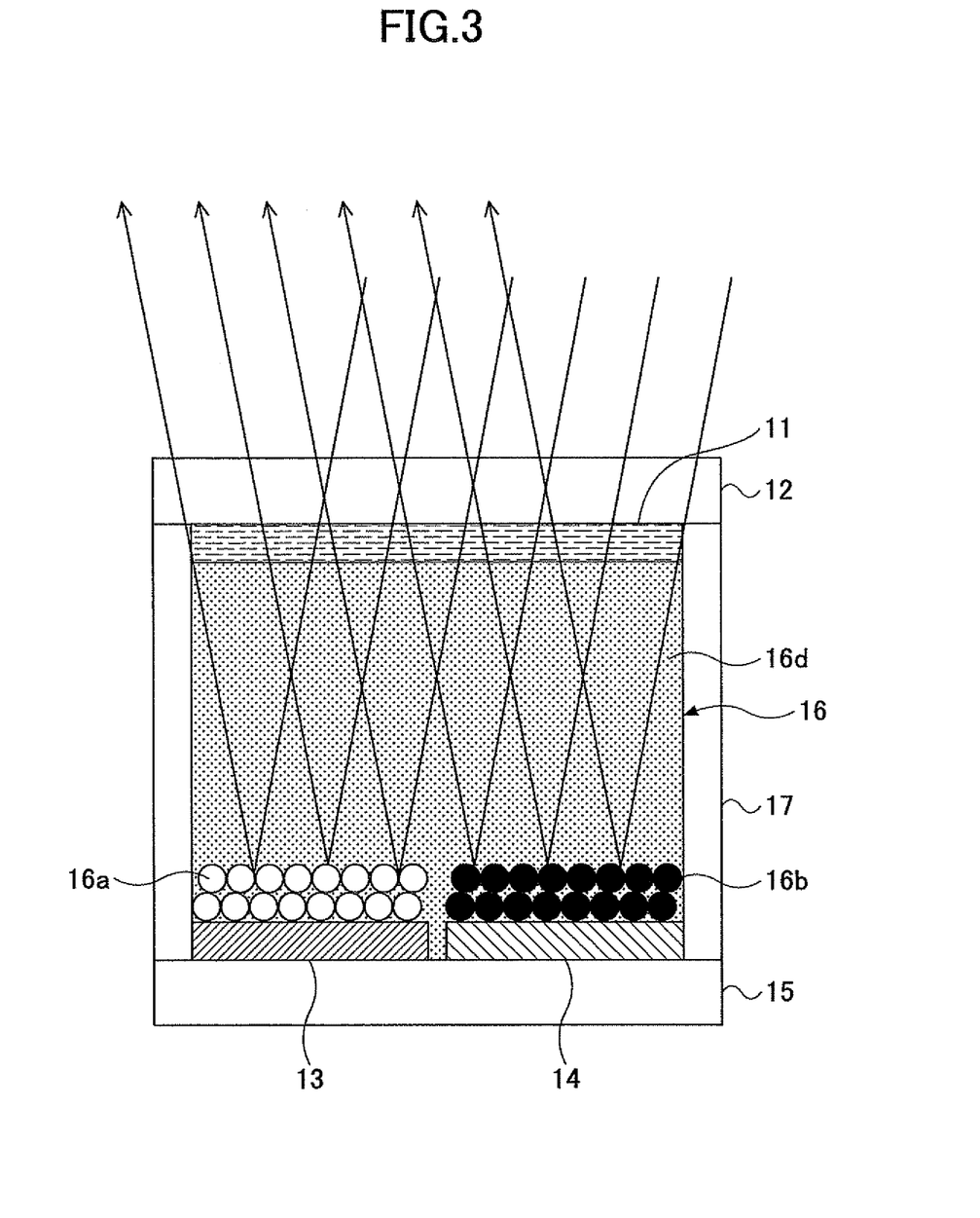
FIG. 3 is a cross-sectional diagram illustrating the display element of FIG. 1 that displays color of a dispersion medium in a case where white non-electrophoretic particles are not dispersed in the dispersion medium.

If the non-electrophoretic white particles 16c are not dispersed in the dispersion medium 16d, incident light absorbed by the electrophoretic black particles 16b accumulated on the third electrode 14 (or second electrode 13) gives no effect on displaying colors. As a result, the color of the dispersion medium 16d is not efficiently displayed (see FIG. 3).

Figure 2:
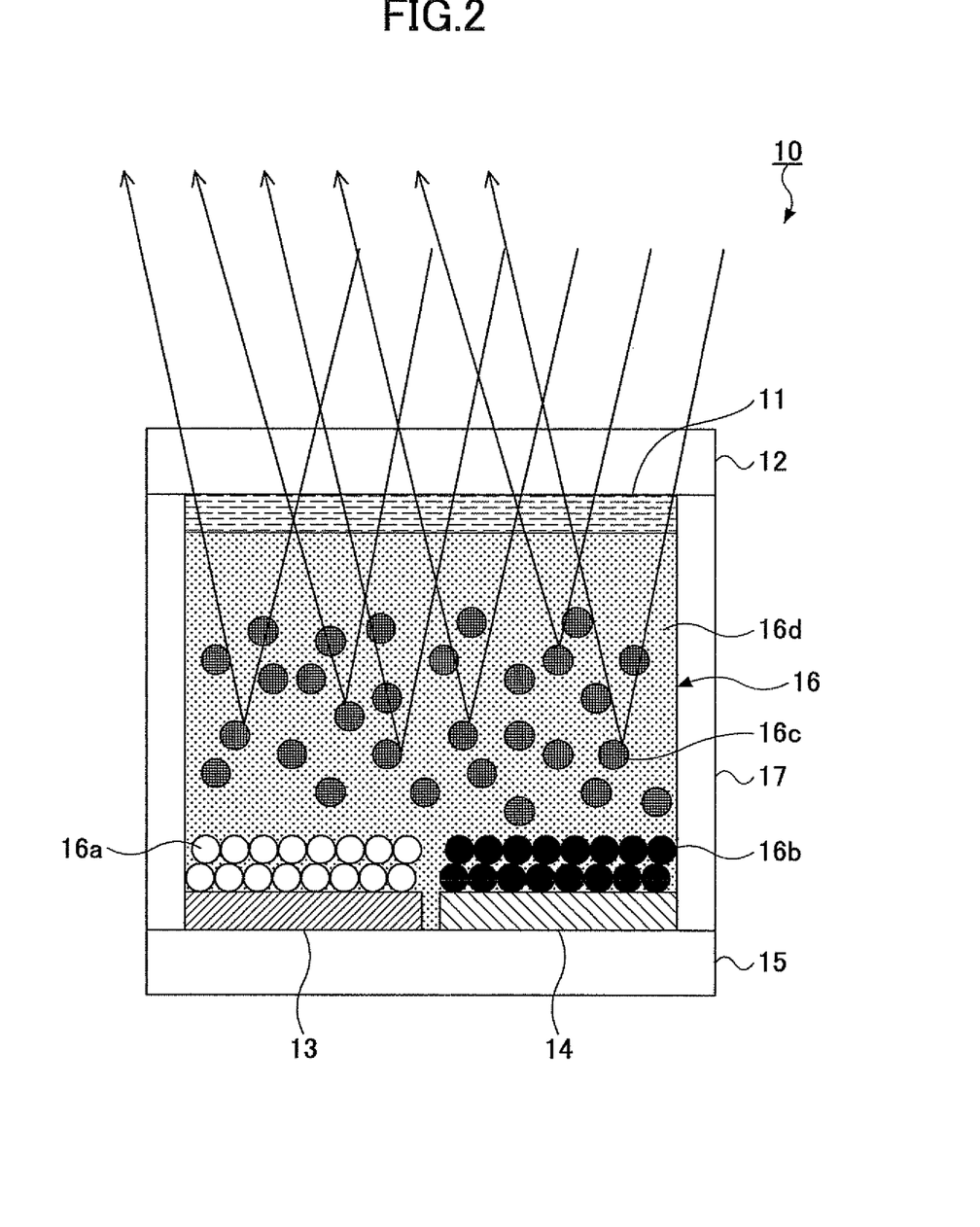
FIG. 2 is a cross-sectional diagram illustrating a state in which a display element of FIG. 1 displays color of a dispersion medium.

In the display element 10 of this embodiment, since the non-electrophoretic white particles 16c are dispersed in the transparent dispersion medium 16d, incident light is reflected by the non-electrophoretic white particles 16c and therefore is not easily absorbed by the electrophoretic black particles 16b. Accordingly, the display element 10 efficiently displays the color of the dispersion medium 16d.

In the display element 10, it is preferable that the electrophoretic liquid 16 have absorbance A of one or more in an entire wavelength range of 400 to 700 nm. If the electrophoretic liquid 16 has the absorbance A of less than one, light incident upon the electrophoretic black particles 16b accumulated on the second electrode 13 or the third electrode 14 may not be reflected and therefore the color is not efficiently displayed. Note that the absorbance A is represented by the following equation, wherein $I_0$ and I represent intensities of incident light and transmission light. The following equation computes the absorbance A in a case where an optical length is a distance between the first electrode 11 and the second and third electrodes 13 and 14.

$$A = \text{Log}_{10}(I_0/I)$$

Further, the ratio of the absolute value of zeta potential of the electrophoretic white particle 16a (or electrophoretic black particle 16b) to that of zeta potential of the non-electrophoretic white particle 16c is preferably in a range of 2 to 100, and is more preferably in a range of 5 to 50. If this ratio is lower than 2, the electrophoretic white particle 16a (or electrophoretic black particle 16b) may not efficiently be electrophoresed. Accordingly, colors of the dyes may not efficiently be displayed. Likewise, if this ratio exceeds 100, the electrostatic repulsion between the electrophoretic white particle 16a (or between electrophoretic black particle 16b) may be too large for the electrophoretic white particle 16a (or electrophoretic black particle 16b) to accumulate on driving electrodes. Accordingly, colors of the dyes may not efficiently be displayed.

As the first electrode 11, any transparent conductive thin films may be used. Examples of the transparent conductive thin films include ITO, $SnO_2$, and ZnO/Al. Note that the first electrode 11 may be formed by sputtering, vacuum evaporation, chemical vapor deposition (CVD), and the like.

Examples of the transparent substrate 12 include, but are not limited to, a glass substrate, and a transparent film substrate of, for example, polyethylene terephthalate (PET), polyethersulfone (PES), and polyethylene naphthalate (PEN).

Figure 4:
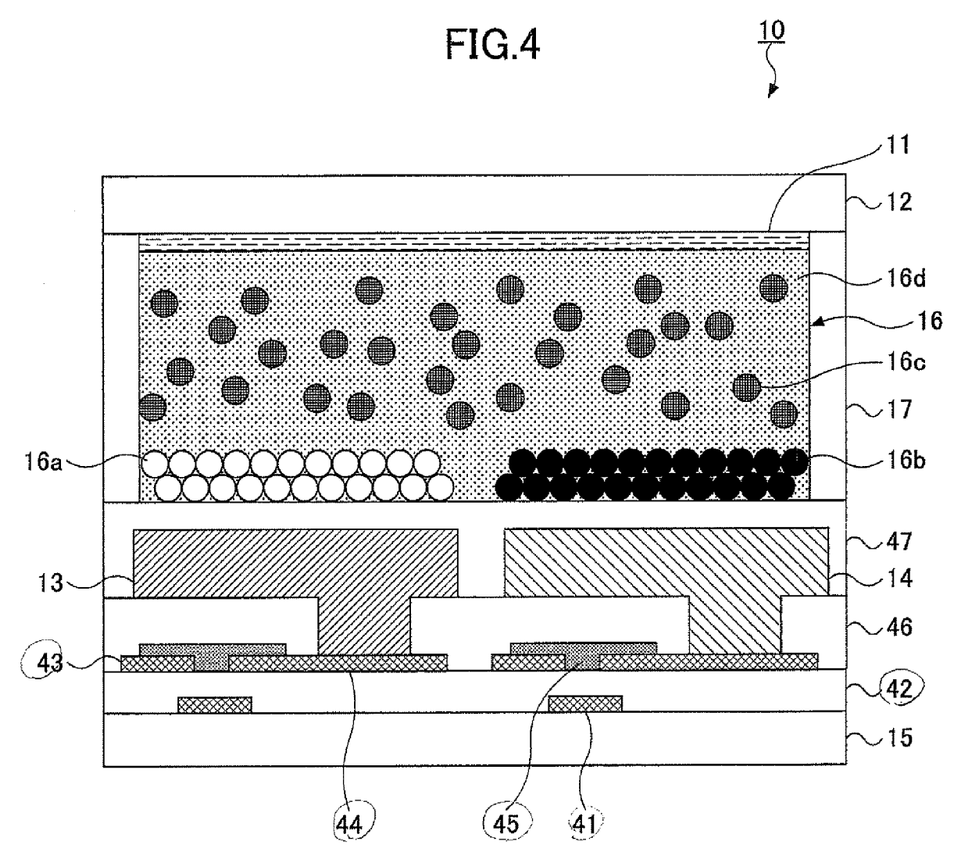
FIG. 4 is a cross-sectional diagram illustrating the display element of FIG. 1 in which a second electrode and a third electrode are connected to respective drain electrodes.

As the second electrode 13 and third electrode 14, any transparent conductive thin films may be used. Examples of the transparent conductive thin films include ITO, $SnO_2$, ZnO/Al, and Ag. The second electrode 13 and the third electrode 14 are preferably connected to the respective drain electrodes of corresponding thin film transistors (see FIG. 4).

Examples of the transparent substrate 15 include, but are not limited to, a glass substrate, a silicone substrate, and a transparent film substrate of, for example, polyethylene terephthalate (PET), polyethersulfone (PES), and polyethylene naphthalate (PEN).

Figure 5:
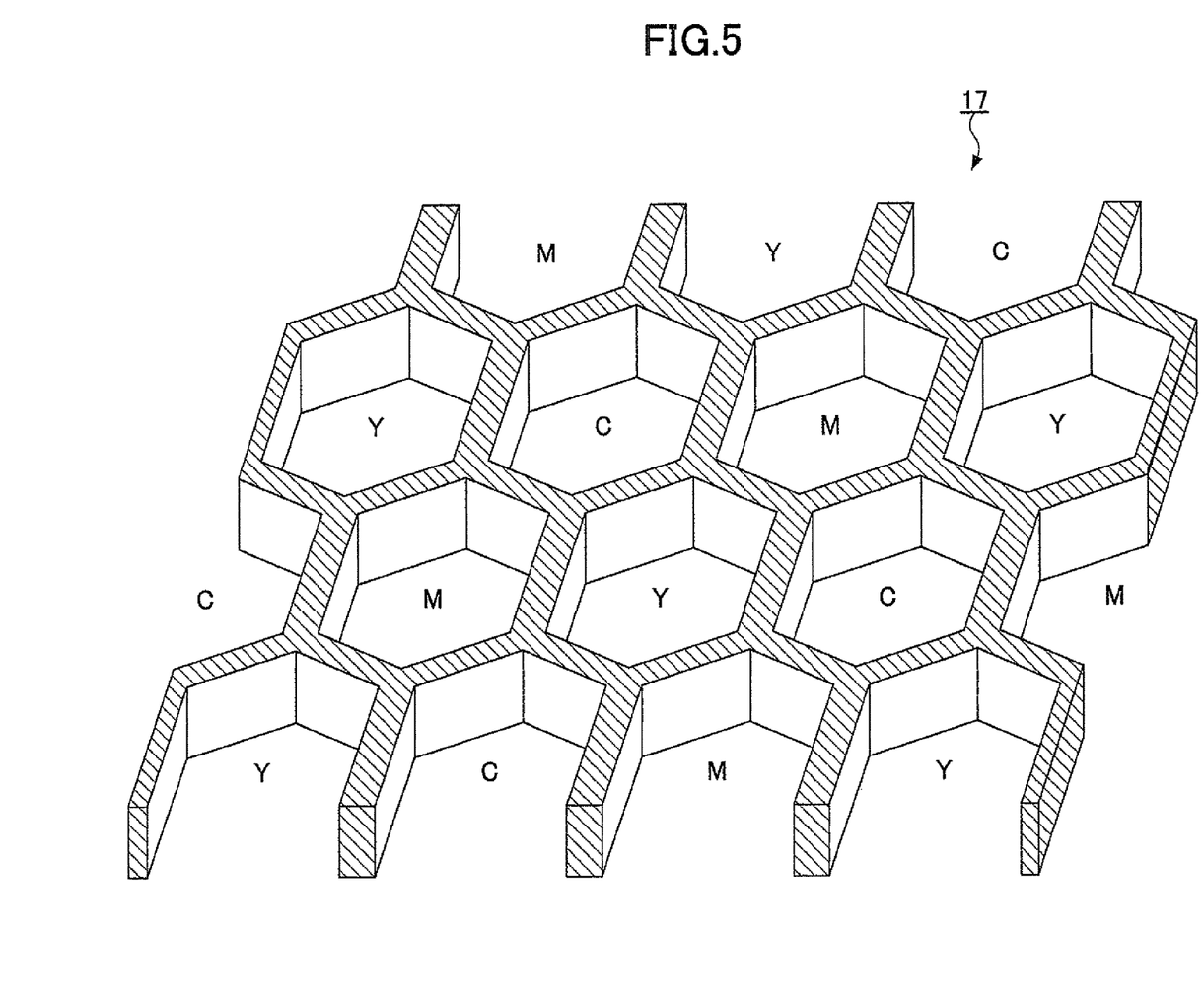
FIG. 5 is a perspective diagram illustrating an example of division walls of FIG. 1.

FIG. 5 illustrates the division walls 17. The division walls 17 employed in this embodiment has a honeycomb structure, however, the structure of division walls 17 is not particularly limited to the honeycomb structure. Note that in a case where the image display medium 100 is used for a full-color display device, it is preferable that three different types of the display elements 10 contain the respective display electrophoretic liquids that can display yellow (Y), magenta (M) and cyan (C) (or red, green, and blue). It is preferable that the display elements containing the electrophoretic liquids displaying the same color not be adjacently arranged.

The thicknesses of the division walls 17 between cells (or openings) are preferably in a range of 0.5 to 20 μm, the depths of cells are preferably in a range of 30 to 200 μm, and the pitches between cells are preferably in a range of 30 to 200 μm.

The division walls 17 between cells may be formed by photolithography. The division walls 17 may also be formed by applying resin to a substrate having hollows arranged in a hexagonal close-packed structure and then forming the resin-applied substrate.

Next, a method for producing the image display medium 100 is described. First, after the division walls 17 are formed on the transparent substrate 12 on which the first electrode 11 is formed (or on the substrate 15 on which the second and third electrodes 13 and 14 are formed), the electrophoretic liquids 16 are injected in the cells between the division walls.

Next, the cells are sealed with a sealing film of insoluble resin in order to prevent drying of the electrophoretic liquids 16 contained in the cells between the division walls 17. The sealing film is formed over the cells containing the electrophoretic liquids 16 by applying the insoluble resin with a coater such as a slit coater. In this process, a surfactant may be added to the insoluble resin so as to reduce a surface tension between the insoluble resin and the electrophoretic liquids 16. Subsequently, the substrate 15 on which the second and third electrodes 13 and 14 are formed is adhered to the sealing film to thereby produce the image display medium 100.

Examples of resins for the division walls 17 include, but are not limited to, polyurethane, polyurea, polyurea-polyurethane, urea-formaldehyde resin, melamine-formaldehyde resin, polyamide, polyester, polysulfonamide, polycarbonate, polysulfinate, epoxy resin, polyacrylic acid ester, polymethacrylic acid ester, polyvinyl acetate, gelatin, and photoresists made from polymethylmethacrylate, novolac resin, or polystyrene.

Examples of resins for the sealing film include, but are not limited to, polyurethane, polyurea, polyurea-polyurethane, urea-formaldehyde resin, melamine-formaldehyde resin, polyamide, polyester, polysulfonamide, polycarbonate, polysulfinate, epoxy resin, polyacrylic acid ester, polymethacrylic acid ester, polyvinyl acetate, and gelatine.

Note that in the display element 10, the second electrode 13 and the third electrode 14 may be formed on the respective division walls 17 that face each other.

Figure 6:
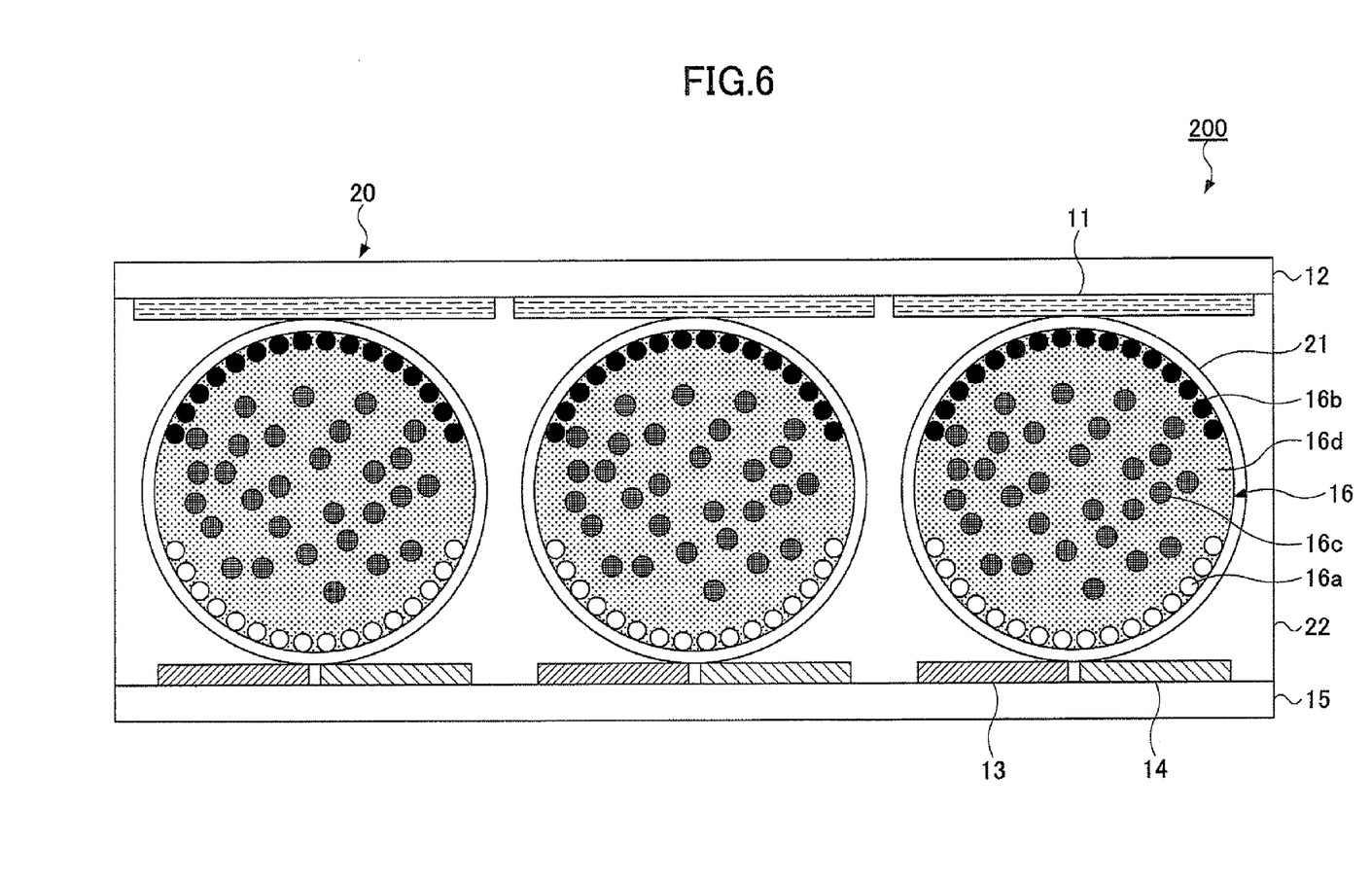
FIG. 6 is a cross-sectional diagram illustrating another example of the electrophoretic display medium according to an embodiment of the invention.

FIG. 6 illustrates another example of an electrophoretic display medium according to an embodiment of the invention. Note that in FIG. 6, components identical to those of FIG. 1 are provided with the same reference numerals, and their descriptions are thus omitted. An image display medium 200 includes plural display elements 20. Each of the display elements 20 includes a transparent substrate 12 having a first transparent electrode 11, a substrate 15 having a second electrode 13 and a third electrode 14 arranged to have a predetermined distance therebetween, a microcapsule 21 containing an electrophoretic liquid 16, and an adhesive supporting layer 22. In the display element 20, the transparent substrate 12 and the substrate 15 are arranged to face each other via the microcapsule 21 containing the electrophoretic liquid 16 and the adhesive supporting layer 22.

The image display medium 200 is formed by applying a mixture of the microcapsules 21 and adhesive that forms the adhesive supporting layer 22 to the transparent substrate 12 on which the first electrode 11 is formed (or on the substrate 15 on which the second and third electrodes 13 and 14 are formed), and bonding the substrate 15 (or the transparent substrate 12) on the transparent substrate 12 (the substrate 15). Coating methods include, but are not limited to, blade-coating, wire-bar-coating, dip-coating, and spin-coating.

Examples of materials for the microcapsules include, but are not limited to, polyurethane, polyurea, polyurea-polyurethane, urea-formaldehyde resin, melamine-formaldehyde resin, polyamide, polyester, polysulfonamide, polycarbonate, polysulfinate, epoxy resin, polyacrylic acid ester, polymethacrylic acid ester, polyvinyl acetate, and gelatine. Note that the microcapsules may be prepared, for example, by an in-situ method, interfacial polymerization, or coacervation.

The outer diameters of the microcapsules are each preferably in a range of 30 and 200 μm.

As the adhesive supporting layer 22, any materials that are adhered to the first, second, and third electrodes 11, 12, and 13 may be used. However, materials that are transparent and have excellent electrical insulating properties are preferable, and solventless curable materials are particularly preferable.

Examples of such materials include photo-curable epoxy resin, urethane resin, and acrylic resin.

Figure 7:
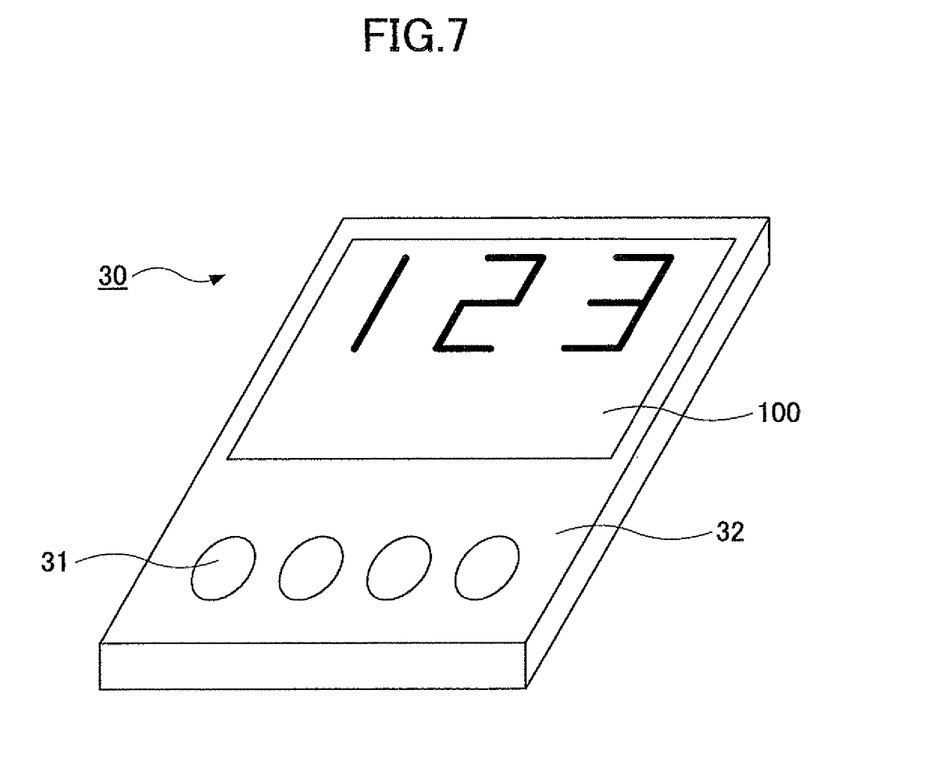
FIG. 7 is a perspective diagram illustrating an example of the image display device according to an embodiment of the invention.

FIG. 7 illustrates an example of an image display device according to an embodiment of the invention. The image display device 30 includes an image display medium 100, an information input unit 31 that supplies image information to the image display medium 100, a case 32, a driving circuit (not shown), an operational circuit (not shown), an internal memory (not shown), and a power supply unit (not shown) that supplies power to the image display medium 100 and also to the information input unit 31. The image display device 30 generates colors of the specified display elements 10 of the image display medium 100 to display an image. The power supply unit may have internal power such as a battery or a power receiving device such as a receptacle (outlet) that receives power from an external power supply.

Note that the image display device may include the image display medium 200 instead of the image display medium 100.

EXAMPLES

The embodiments of the invention are described further in detail with reference to the following examples; however, the invention is not limited to the following examples. Note that "parts" in the following examples indicate "parts by mass".

<Preparation of Electrophoretic White Particles>

In a reactor with an agitator, a mixed solvent composed of 93 parts of ethanol and 7 parts of water was prepared, and the pH of the mixed solvent was adjusted to 4.5 by adding glacial acetic acid. Next, after 16 parts of 3-(trimethoxysilyl)propyl methacrylate was dissolved in the mixture, 100 parts of titanium oxide was added with stirring for 10 minutes. After 180 parts of ethanol was further added with stirring, a solid content was recovered by centrifugation, which was then left to stand for one day. Thereafter, the obtained solid content was vacuum-dried at 70° C. for 4 hours to thereby obtain a surface-treated titanium oxide.

In another reactor with an agitator, a thermometer and a reflux condenser, 70 parts of toluene was prepared and 50 parts of lauryl methacrylate was then dissolved in the toluene. Next, 40 parts of the surface-treated titanium oxide and 25 parts of 0.3 parts of azobisisobutyronitrile dissolved toluene were added to the mixture and stirred under nitrogen atmosphere at 70° C. for 7 hours. Thereafter, a recovered solid content was washed with toluene by repeatedly conducting centrifugation and finally vacuum-dried at 70° C. for 4 hours to thereby obtain desired electrophoretic white particles.

The obtained electrophoretic white particles exhibit excellent dispersibility in solvents Isopar-G, Isopar-H, and Isopar-L (produced by Exxon Mobil Corporation) each containing a surfactant Solsperse 17000 (produced by Avecia Ltd.) and exhibit behaviors of negatively charged electrophoretic particles when the electric field of 2 kV/cm is applied between the two electrodes facing each other.

<Preparation of Electrophoretic Black Particles>

In a reactor with an agitator, a thermometer and a reflux condenser, 100 parts of water, 4 parts of carbon black (produced by Degussa Ltd.), 0.1 parts of hydrochloric acid (37 mass %), and 0.1 parts of 4-vinylaniline were prepared and the mixture was then stirred. Next, an aqueous solution prepared by dissolving 0.05 parts of sodium nitrite dissolved in 0.35 parts of water was added dropwise for about one hour. The obtained mixture was heated to 65° C. with stirring for 3 hours and then was cooled to room temperature with stirring for one day. Thereafter, a solid content was recovered by centrifugation and the solid content was then dispersed in water. The solid content was further recovered by centrifugation, left to stand for one day and vacuum-dried at 70° C. for 4 hours to thereby obtain a surface-treated carbon black.

In a reactor with an agitator, a thermometer and a reflux condenser, 100 parts of water, 50 parts of the surface-treated carbon black, 100 parts of toluene, 100 parts of 2-ethylhexyl methacrylate, and 0.65 parts of azobisisobutyronitrile were prepared and the mixture was then stirred. Next, the mixture was stirred under nitrogen atmosphere at 70° C. for 7 hours and was then cooled to room temperature. Thereafter, 500 parts of tetrahydrofuran was further added with stirring and 3000 parts of methanol was then added to precipitate a solid content. The solid content was recovered by suction filtration. Thereafter, the recovered solid content was washed with tetrahydrofuran by repeatedly conducting centrifugation and finally vacuum-dried at 70° C. for 4 hours to thereby obtain desired electrophoretic black particles each having an average particle diameter of 120 nm.

The electrophoretic black particles exhibit excellent dispersibility in solvents Isopar-G, Isopar-H, and Isopar-L (produced by Exxon Mobil Corporation) each containing a surfactant Solsperse 17000 (produced by Avecia Ltd.) and exhibit behaviors of positively charged electrophoretic particles when the electric field of 2 kV/cm is applied between the two electrodes facing each other.

<Preparation of Non-Electrophoretic White Particles (1)>

In a reactor with an agitator, a thermometer and a reflux condenser, 10 mL of silicone oil having viscosity of 1 cP was prepared, and 3.0 g of 2-vinylnaphthalene and 3.0 g of polydimethylsiloxane were added and the mixture was then stirred. Next, 2 mol % of lauroyl peroxide with respect to 2-vinylnaphthalene was added, the mixture was then stirred under nitrogen atmosphere at 70° C. for 24 hours to thereby obtain desired non-electrophoretic white particles (1) formed of polyvinylnaphthalene each having an average particle diameter of 470 nm.

The non-electrophoretic white particles (1) exhibit excellent dispersibility in solvents Isopar-G, Isopar-H, and Isopar-L (produced by Exxon Mobil Corporation), however, do not exhibit behaviors of electrophoretic particles when the electric field of 5 kV/cm is applied between the two electrodes facing each other.

The non-electrophoretic white particles (1) formed of polyvinylnaphthalene were dispersed in solvents Isopar-G, Isopar-H, and Isopar-L, and the absorbance of the liquid containing non-electrophoretic white particles (1) was measured at an optical length of 100 μm. The resulting absorbance of the liquid containing non-electrophoretic white particles (1) was one or more in an entire wavelength range of 400 to 700 nm when the concentration of the liquid containing non-electrophoretic white particles (1) was 4.5 mass %. In practice, positively charged particles Isopar are colored with dyes. Accordingly, when the absorbance of the actual electrophoretic liquid is measured, the absorbance of the actual electrophoretic liquid containing positively charged particles may be larger than that of the liquid containing non-electrophoretic white particles (1), due to the effect of the dyes. Accordingly, the absorbance of the actual electrophoretic liquid is one or more, provided that the weight ratio of vinylnaphthalene to each of solvents Isopar-G, Isopar-H, and Isopar-L is 4.5 mass % or more.

<Preparation of Non-Electrophoretic White Particles (2)>

In a reactor with an agitator, a thermometer and a reflux condenser, 40 parts of toluene and 60 parts of titanium oxide were prepared, and 0.6 parts of 3-(trimethoxysilyl) propyl methacrylate was then dissolved in the mixture. Next, zirconia balls each having a diameter of 2 mm were added to the mixture with dispersing, and the mixture was heated at 55° C. with stirring for 7 hours. After 150 parts of lauryl methacrylate was dissolved in the mixture, 0.5 parts of azobisdimethylvaleronitrile was added, and the obtained mixture was further stirred under nitrogen atmosphere at 55° C. for 7 hours. Thereafter, a recovered solid content was washed with tetrahydrofuran by repeatedly conducting centrifugation and finally vacuum-dried at 70° C. for 4 hours to thereby obtain desired non-electrophoretic white particles (2) each having an average particle diameter of 400 nm.

The non-electrophoretic white particles (2) exhibit excellent dispersibility in solvent Isopar-G, Isopar-H, Isopar-L (produced by Exxon Mobil Corporation), however, do not exhibit behaviors of electrophoretic particles when the electric field of 2 kV/cm is applied between the two electrodes facing each other.

The non-electrophoretic white particles (2) formed of surface-treated titanium oxide were dispersed in solvents Isopar-G, Isopar-H, and Isopar-L, and the absorbance of the liquid containing non-electrophoretic white particles (2) was measured at an optical length of 100 μm. The resulting absorbance of the liquid containing non-electrophoretic white particles (2) was one or more in an entire wavelength range of 400 to 700 nm when the concentration of the liquid containing non-electrophoretic white particles was 1.0 mass %. In practice, positively charged particles Isopar were colored with dyes. Accordingly, when the absorbance of the actual electrophoretic liquid is measured, the absorbance of the actual electrophoretic liquid containing positively charged particles may be larger than that of the liquid containing non-electrophoretic white particles (2), due to the effect of the dyes. Accordingly, the absorbance of the actual electrophoretic liquid is one or more, provided that the weight ratio of the surface-treated titanium oxide to each of solvents Isopar-G, Isopar-H, and Isopar-L is 1.0 mass % or more.

Example 1

A first electrophoretic liquid containing 0.3 to 0.8 mass % of a dye of oil-blue N (produced by Ardrich Co.), 10 to 20 mass % of electrophoretic white particles, 0.5 to 2.0 mass % of electrophoretic black particles, 15 to 20 mass % of non-electrophoretic white particles (1), 0.2 to 0.5 mass % of Solsperse 17000 (produced by Avecia Ltd.), and a residue of Isopar-G was prepared.

Figure 8:
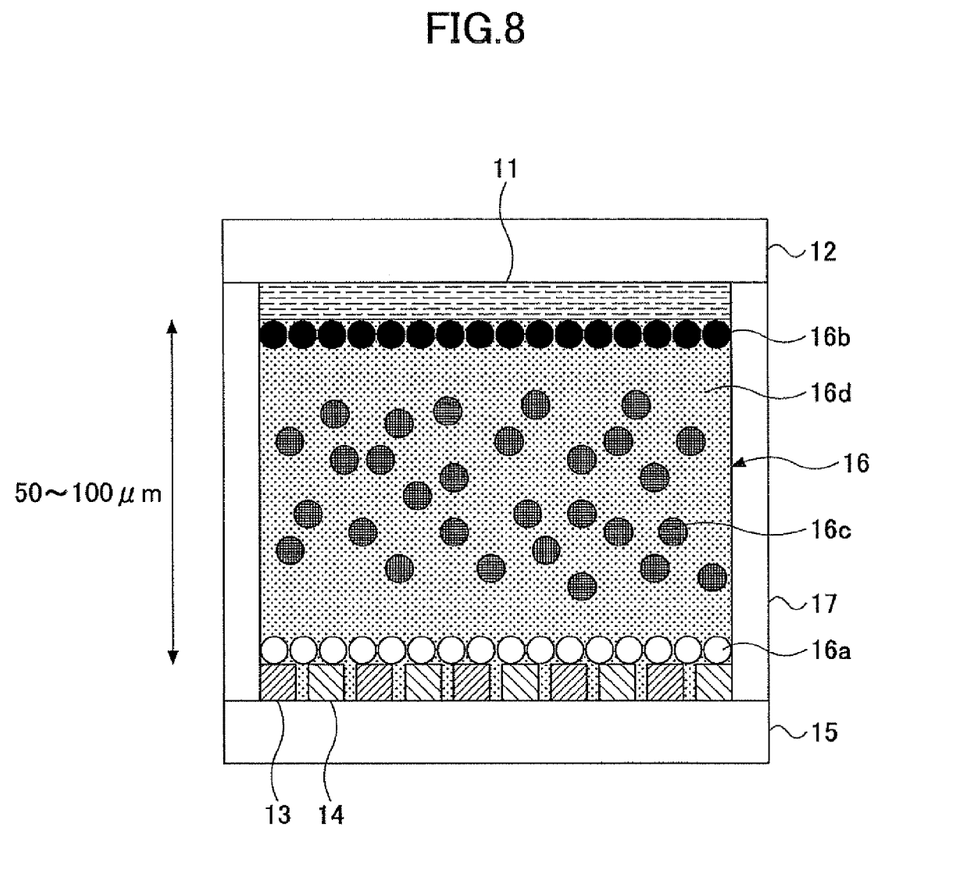
FIG. 8 is a cross-sectional diagram illustrating a display element demonstrated in examples.
Figure 9:
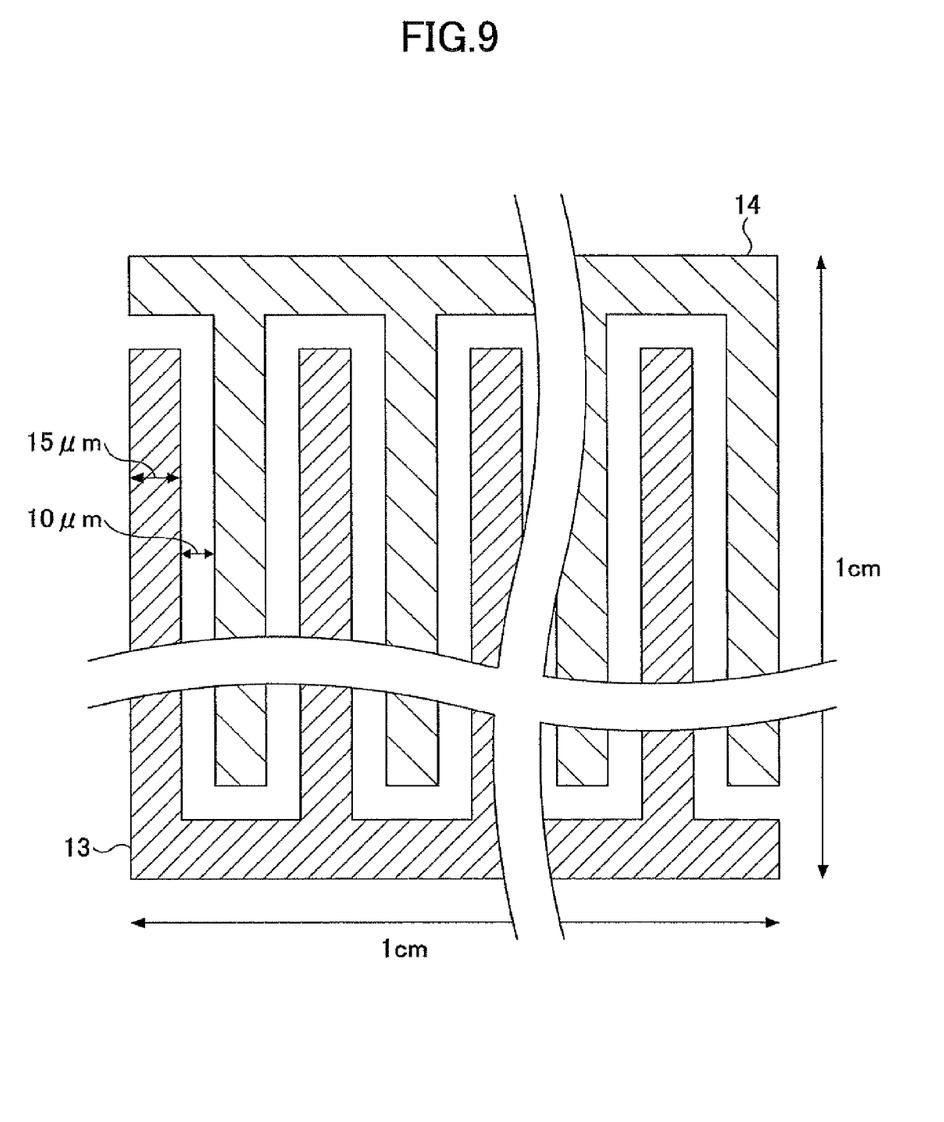
FIG. 9 is a top view illustrating structures of a second electrode and a third electrode of FIG. 8.

The display element illustrated in FIG. 8 was produced as a first display element. Specifically, the first display element was produced in the following procedure: after a UV adhesive containing glass beads each having an average particle diameter of 50 to 100 μm was applied around the second electrode 13 (ITO film) and the third electrode 14 (ITO film) of the substrate 15 (glass plate), the transparent substrate 12 (glass plate) on which the transparent electrode 11 is formed is bonded on the substrate 15, and the bonded substrates are then adhered by UV irradiation. Note that two openings are provided when the UV adhesive was applied around the second and third electrodes 13 and 14. Next, after having injected the electrophoretic liquid 16 via one of the openings, the two openings were filled with the UV adhesive and then UV irradiated. The first display element was thus produced. Note that the second electrode 13 and third electrode 14 each having a pectinate structure with a width of 15 μm are assembled such that ends of the second electrode 13 and third electrode 14 are alternately arranged at intervals of 10 μm (see FIG. 9). The assembly of the second electrode 13 and third electrode 14 has a square shape having 1 cm sides which is schematically illustrated in FIG. 8.

The first display element displayed black when a voltage of +15 V was applied to the second and third electrodes 13 and 14. Likewise, the first display element displayed white when a voltage of −15 V was applied to the second and third electrodes 13 and 14. Further, the first display element displayed blue when voltages of +10 V and −10 V were applied to the second and third electrodes 13 and 14, respectively.

Example 2

A second electrophoretic liquid containing 0.5 to 1.4 mass % of a dye of oil-blue N (produced by Ardrich Co.), 15 to 30 mass % of electrophoretic white particles, 0.5 to 2.0 mass % of electrophoretic black particles, 1 to 4 mass % of non-electrophoretic white particles (2), 0.2 to 0.5 mass % of Solsperse 17000 (produced by Avecia Ltd.), and a residue of Isopar-G was prepared.

A second display element was produced in the same procedure as Example 1 except that the second electrophoretic liquid was used in place of the first electrophoretic liquid. The second display element displayed black when a voltage of +15 V was applied to the second and third electrodes 13 and 14. Likewise, the second display element displayed white when a voltage of −15 V was applied to the second and third electrodes 13 and 14. Further, the second display element displayed blue when voltages of +10 V and −10 V were applied to the second and third electrodes 13 and 14, respectively.

Example 3

A third electrophoretic liquid containing 4 to 10 mass % of a dye of oil-green 502 (produced by Ardrich Co.), 15 to 25 mass % of electrophoretic white particles, 0.5 to 2.0 mass % of electrophoretic black particles, 5.0 to 15 mass % of non-electrophoretic white particles (1), 0.2 to 0.5 mass % of Solsperse 17000 (produced by Avecia Ltd.), and a residue of Isopar-G was prepared.

A third display element was produced in the same procedure as Example 1 except that the third electrophoretic liquid was used in place of the first electrophoretic liquid. The third display element displayed black when a voltage of +15 V was applied to the second and third electrodes 13 and 14. Likewise, the third display element displayed white when a voltage of −15 V was applied to the second and third electrodes 13 and 14. Further, the third display element displayed green when voltages of +10 V and −10 V were applied to the second and third electrodes 13 and 14, respectively.

Example 4

A fourth electrophoretic liquid containing 0.2 to 0.6 mass % of a dye of oil-red 5B (produced by Ardrich Co.), 0.2 to 0.6 mass % of a dye of Sudan-red 7B (produced by Ardrich Co.), 15 to 25 mass % of electrophoretic white particles, 0.5 to 2.0 mass % of electrophoretic black particles, 10 to 20 mass % of non-electrophoretic white particles (1), 0.2 to 0.5 mass % of Solsperse 17000 (produced by Avecia Ltd.), and a residue of Isopar-G was prepared.

A fourth display element was produced in the same procedure as Example 1 except that the fourth electrophoretic liquid was used in place of the first electrophoretic liquid. The fourth display element displayed black when a voltage of +15 V was applied to the second and third electrodes 13 and 14. Likewise, the fourth display element displayed white when a voltage of −15 V was applied to the second and third electrodes 13 and 14. Further, the fourth display element displayed red when voltages of +10 V and −10 V were applied to the second and third electrodes 13 and 14, respectively.

Example 5

A fifth electrophoretic liquid containing 0.1 to 0.4 mass % of a dye of oil-yellow 3G (produced by Ardrich Co.), 0.1 to 0.2 mass % of a dye of quinoline-yellow (produced by Ardrich Co.), 15 to 25 mass % of electrophoretic white particles, 0.5 to 2.0 mass % of electrophoretic black particles, 5.0 to 15 mass % of non-electrophoretic white particles (1), 0.2 to 0.5 mass % of Solsperse 17000 (produced by Avecia Ltd.), and a residue of Isopar-G was prepared.

A fifth display element was produced in the same procedure as Example 1 except that the fifth electrophoretic liquid was used in place of the first electrophoretic liquid. The fifth display element displayed black when a voltage of +15 V was applied to the second and third electrodes 13 and 14. Likewise, the fifth display element displayed white when a voltage of −15 V was applied to the second and third electrodes 13 and 14. Further, the fifth display element displayed yellow when voltages of +10 V and −10 V were applied to the second and third electrodes 13 and 14, respectively.

Example 6

A sixth electrophoretic liquid containing 0.2 to 0.6 mass % of a dye of Sudan-red 7B (produced by Ardrich Co.), 15 to 25 mass % of electrophoretic white particles, 0.5 to 2.0 mass % of electrophoretic black particles, 15 to 25 mass % of non-electrophoretic white particles (1), 0.2 to 0.5 mass % of Solsperse 17000 (produced by Avecia Ltd.), and a residue of Isopar-G was prepared.

A sixth display element was produced in the same procedure as Example 1 except that the sixth electrophoretic liquid was used in place of the first electrophoretic liquid. The sixth display element displayed black when a voltage of +15 V was applied to the second and third electrodes 13 and 14. Likewise, the sixth display element displayed white when a voltage of −15 V was applied to the second and third electrodes 13 and 14. Further, the sixth display element displayed magenta when voltages of +10 V and −10 V were applied to the second and third electrodes 13 and 14, respectively.

Example 7

A seventh electrophoretic liquid containing 0.3 to 0.8 mass % of a dye of oil-blue N (produced by Ardrich Co.), 2.0 to 10 mass % of a dye of oil-green 502 (produced by Ardrich Co.), 15 to 25 mass % of electrophoretic white particles, 0.5 to 2.0 mass % of electrophoretic black particles, 10 to 20 mass % of non-electrophoretic white particles (1), 0.2 to 0.5 mass % of Solsperse 17000 (produced by Avecia Ltd.), and a residue of Isopar-G was prepared.

A seventh display element was produced in the same procedure as Example 1 except that the seventh electrophoretic liquid was used in place of the first electrophoretic liquid. The seventh display element displayed black when a voltage of +15 V was applied to the second and third electrodes 13 and 14. Likewise, the seventh display element displayed white when a voltage of −15 V was applied to the second and third electrodes 13 and 14. Further, the seventh display element displayed cyan when voltages of +10 V and −10 V were applied to the second and third electrodes 13 and 14, respectively.

Example 8

The image display medium 100 was produced (see FIG. 1) as a first image display medium. Specifically, after the second electrode 13 (ITO film) and third electrode 14 (ITO film) each having a width of 60 μm and the length of 60 μm were formed on the substrate 15 (PET film), a protective film was formed over the second and third electrodes 13 and 14. Then, the division walls 17 of the cells were formed by photolithography using a photoresist SU-8 (produced by Nippon Kayaku Kayaku Co., Ltd). The division walls 17 were formed such that each wall had the thickness of 5 to 15 μm, the depth of 40 to 100 μm, and the bottom face of each cell had a rectangular shape having a size of 160×100 μm. Next, the electrophoretic liquids 16 prepared in Examples 5, 6, and 7 were each injected in a corresponding one of the cells by inkjet nozzles, and a sealing film was formed over the injected electrophoretic liquids 16. Specifically, a polyoxyethylene surfactant added gelatin resin that was heated to about 40° C. was applied over the electrophoretic liquids using a slit coater and was then dried to form the sealing film. Next, an adhesive was applied to the sealing film, and the transparent substrate 12 (PET film) on which the first electrode 11 (ITO film) was formed was bonded to the sealing film. As a result, the first image display medium capable of displaying multiple colors was produced.

Example 9

A second image display medium capable of displaying multiple colors was produced in the same procedure as Example 8 except that the electrophoretic liquids 16 prepared in Examples 1, 2, and 3 were used instead of the electrophoretic liquids 16 prepared in Examples 5, 6, and 7.

As described above, the embodiments of the invention may provide an electrophoretic liquid capable of efficiently displaying colors of dyes, an image display medium containing the electrophoretic liquid, and an image display device having the image display medium.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2009-005084 filed on Jan. 13, 2009, the entire contents of which are hereby incorporated herein by reference.

The invention claimed is:
1. An image display medium comprising:
a plurality of display elements, each display element amongst the plurality of display elements comprising an electrophoretic liquid comprising:
a first electrophoretic particle,
a second electrophoretic particle having a polarity opposite to that of the first electrophoretic particle,
a non-electrophoretic particle, and
a transparent dispersion medium;
a first transparent electrode;
a second electrode; and
a third electrode,
wherein the first, second, and non-electrophoretic particles are dispersed in the transparent dispersion medium, wherein in said each display element, the first electrode is arranged so as to face the second electrode and the third electrode, and wherein absorbance of the electrophoretic liquid is one or more in an entire wavelength range of 400 to 700 nm in a case where an optical length is determined as a distance between the first electrode and the second and third electrodes, and wherein a ratio of an absolute value of a zeta potential of the first electrophoretic particle to that of a zeta potential of the non-electrophoretic particle is in a range of 2 to 100, wherein the first particle is made of surface-modified titanium dioxide, a surface of the titanium dioxide having been modified with a silane coupling agent having a methoxy group and additionally having been polymerized with a monomer having a lauryl group, wherein the second particle is made of at least one of (a) surface-modified carbon black, a surface of the carbon black having been modified with a diazo coupling agent having a vinyl group and additionally having been polymerized with a monomer having a 2-ethylhexyl group, and (b) surface-modified titanium black, a surface of the titanium black having been modified with a silane coupling agent having a methoxy group and additionally having been polymerized with monomers having a lauryl group, wherein the non-electrophoretic particle is made of at least one of polyvinylnaphthalene, polyvinylcarbazole and surface-modified titanium dioxide, the titanium dioxide having been coated with polyvinylnaphthalene, and wherein the dispersion medium includes a nonpolar solvent and a dye.

2. The image display medium as claimed in claim 1, wherein a first one of the plurality of display elements contains the electrophoretic liquid having the dispersion medium colored with yellow;

a second one of the plurality of display elements contains the electrophoretic liquid having the dispersion medium colored with cyan; and a third one of the plurality of display elements contains the electrophoretic liquid having the dispersion medium colored with magenta.

3. The image display medium as claimed in claim 1, wherein a first one of the plurality of display elements contains the electrophoretic liquid having the dispersion medium colored with red;

a second one of the plurality of display elements contains the electrophoretic liquid having the dispersion medium colored with green; and a third one of the plurality of display elements contains the electrophoretic liquid having the dispersion medium colored with blue.

4. An image display device comprising the image display medium as claimed in claim 1.

* * * * *